US00RE34310E

United States Patent [19]

Duncan

[11] E Patent Number: Re. 34,310

[45] Reissued Date of Patent: Jul. 13, 1993

[54] VARIABLE PRELOAD BEARING APPARATUS

[75] Inventor: Coleman Duncan, Burlington, Conn.

[73] Assignee: The Torrington Company, Torrington, Conn.

[21] Appl. No.: 806,034

[22] Filed: Dec. 12, 1991

Related U.S. Patent Documents

Reissue of:

[64] Patent No.: 5,051,005
Issued: Sep. 24, 1991
Appl. No.: 569,012
Filed: Aug. 17, 1990

[51] Int. Cl.[5] ..... F16C 19/08
[52] U.S. Cl. ..... 384/517
[58] Field of Search ..... 384/461, 517, 518, 563, 384/512, 551, 500

[56] References Cited

U.S. PATENT DOCUMENTS 3,352,611 11/1967 Seidel ..... 384/461
4,400,098 8/1983 Lacey et al. ..... 384/517
4,657,412 4/1987 McLarty et al. ..... 384/517
4,780,001 10/1988 Werner ..... 384/563
4,850,719 7/1989 Moseley et al. ..... 384/517

*Primary Examiner*—Lenard A. Footland
*Attorney, Agent, or Firm*—John C. Bigler

[57] ABSTRACT

An apparatus including a shaft, with a first and a second angular contact bearing axially disposed along the shaft to provide support for the shaft in a first and a second axial direction, respectively. The second axial direction is substantially opposite the first axial direction. A preload device exerts a preload force onto the angular contact bearings, which place the angular contact bearings into a maximum preload condition. An actuator device, acting in opposition to the preload device, reduces preload from the maximum preload condition to a desired preload condition. The preload device and the actuator device act directly through an axial displaceable race of the angular contact bearing, instead of through the rolling elements of the bearing.

19 Claims, 4 Drawing Sheets

VARIABLE PRELOAD BEARING APPARATUS

Matter enclosed in heavy brackets [ ] appears in the original patent but forms no part of this reissue specification; matter printed in italics indicates the additions made by reissue.

BACKGROUND OF THE INVENTION

This invention relates generally to anti-friction bearing type spindles, shafts or axles, and more particularly, to an apparatus to control the preload force on a set of angular contact bearings which are exposed to reversing thrust loads.

When angular contact bearings are used to control the radial and/or axial displacement of the shaft, they are typically used in preloaded pairs (or multiple sets) oriented in a front-to-front, a back-to-back, tandem or any suitable combination of these mounting arrangements.

The pair of bearings are generally preloaded, such that any force exerted on the shaft in either axial direction will instantly encounter substantial resistance by the respective bearing, which is to support the load in that direction, with minimal shaft deflection.

Preload is a parasitic load imposed on the bearings for the dual purpose of controlling shaft deflections from externally applied loads and maintaining proper bearing geometry and frictional forces within the bearing for efficient performance. If the shaft is being exposed to varying speeds and loads, then it is often desired to vary the preload to obtain optimized performance.

U.S. Pat. No. 2,314,622 shows a bearing mount which involves a resilient member which applies a preload to a shaft. There are many other designs which control the preload force which is exerted upon the bearings.

U.S. Pat. No. 4,551,032 shows a spindle which has bearing members attached. A yieldable member, whose flexibility is controlled by the pressure of a fluid which is forced into a cavity in the yieldable member, and thus controls the preload which is applied to the bearings.

U.S. Pat. No. 4,850,719 shows a variable stiffness angular contact bearing wherein the stiffness of the bearing is controlled by piezoelectric wafers which control the preload applied to the bearings.

While all of the above are variable preload devices, an increase in the actuating force which applies the preload may not always result in a similar increase in force being applied to the bearings. The static frictional forces between the bearing housing interface is significant in comparison to the desired variations in preload. This static frictional force is not uniform and as a result cannot be accurately compensated in most variable preload systems. It is difficult to precisely vary the preload directly applied to the bearing, for these reasons the bearings can be overloaded if frictional forces are not adequately accounted for. A precise mechanical preload varying device is costly and requires space.

The varying preload forces of the above patents are all applied directly through the roller elements. Since the roller elements typically cannot take excessive forces, the magnitude of the forces applied by the preload are generally quite small. In all of the hydraulic and pneumatic preload systems, this results in a substantial increase in mechanical compliancy in a thrust direction.

The foregoing illustrates limitations known to exist in present bearing preload control systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus including a shaft, with a first and a second angular contact bearing axially disposed along the shaft for supporting the shaft in a first and a second axial direction, respectively. The second axial direction is substantially opposite the first axial direction.

A preload device exerts a preload force onto the angular contact bearings, which place the angular contact bearings into a maximum preload condition. An actuator device, acting in opposition to the preload device, reduces preload from the maximum preload condition to a desired preload condition.

The foregoing and other aspects will become apparent from the following detailed description of the invention when considered in conjunction with the accompanying drawing figures.

DETAILED DESCRIPTION

Figure 1:
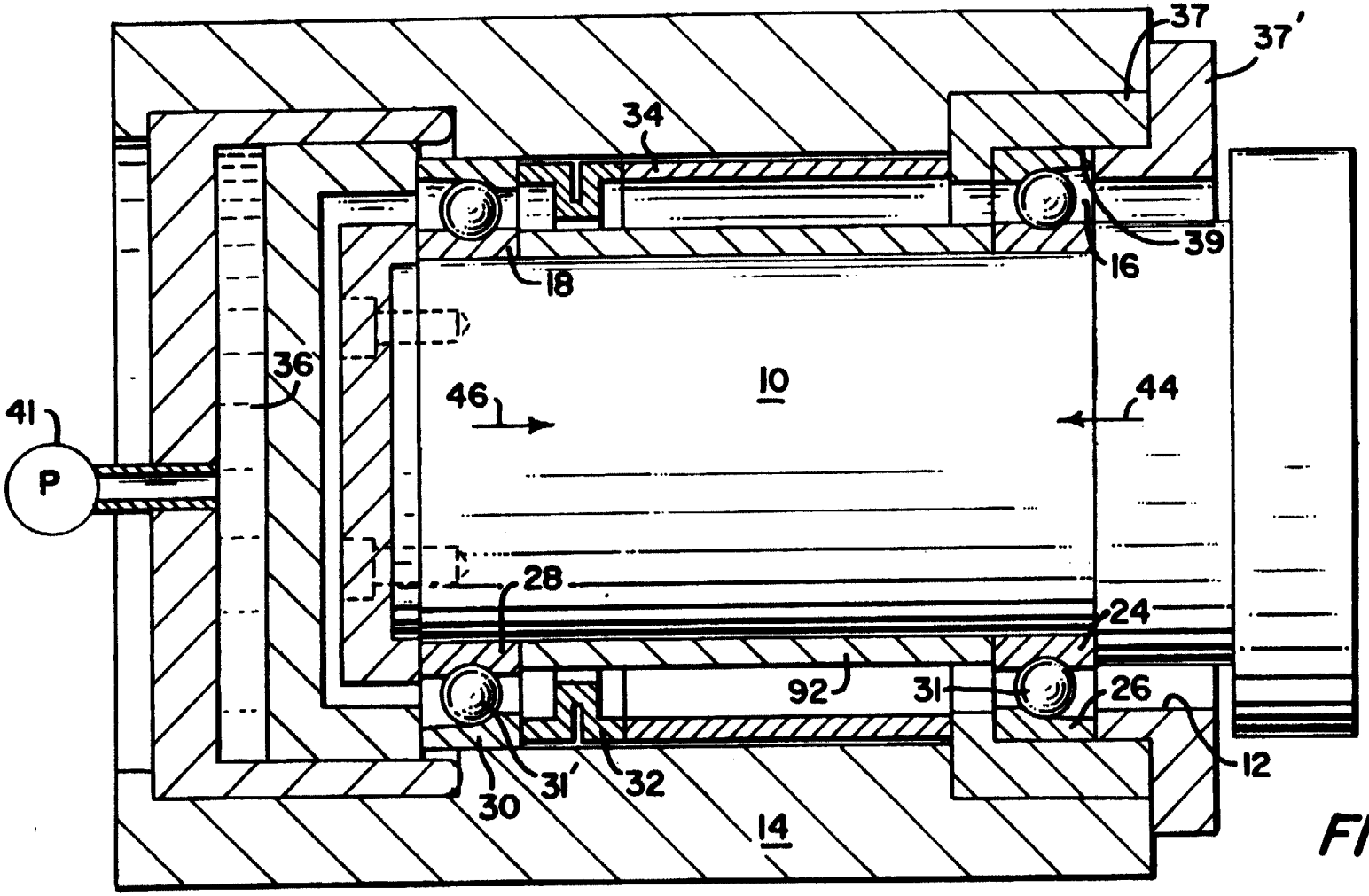
FIG. 1 is a side cross-sectional elevation view illustrating an embodiment of a rotary shaft supported by a plurality of preloaded bearings.

In this specification, identical elements in different embodiments are given identical reference characters.

Referring to FIG. 1, a rotary shaft, spindle or axle 10 is mounted in an aperture 12 formed in a housing 14 by a first and second angular contact bearing 16, 18. The instant invention relates to preload of the angular contact bearings 16, 18.

The angular contact bearings 16, 18 may be angular contact ball bearings, radial ball bearings or tapered roller thrust bearings.

Even though the instant invention is especially applicable to machine tools with rotary spindles, it may be suitably applied to any device or vehicle with a rotating axle, shaft, spindle, or housing.

The first angular contact bearing 16 has an inner race 24 which is fixed relative to the rotary shaft 10 while an outer race 26 is fixed relative to the housing 14.

An inner race 28 of the second bearing is fixed with respect to the rotary shaft 10. Therefore, only an outer race 30 of the second angular contact bearing 18 may be axially displaced to place the first and the second angular contact bearings 16, 18 in a preloaded state.

A preload means 32 is a device, such as a high stiffness spring, whose deflection is insignificant compared to the bearing deflection at the maximum preload condition. In conjunction with the standard preloaded bearings, the preload device exerts a force on the outer race 30 of the second angular contact bearing 18, thus placing the first and the second angular contact bearings 16, 18 under the maximum preload condition. The only support for the rotary shaft 10 is the first and the second angular contact bearings 16, 18.

The manufactured in preload of bearings 16, 18 is the maximum preload condition that the angular contact bearings 16, 18 are intended to experience over the intended range of operating conditions. The maximum preload condition depends upon the spring rate of the preload device 32, the manufactured in preload of bearings 16, 18 and the spacer length differentials between axial shaft and axial housing spacers 92, 34.

A force applied from [the actuating means] *actuating means 36*, through the outer race 30 of the first bearing 18[, 36] to the preload device 32 causes the preload device to deflect thereby reducing the initial deflection (preload) in the balls and races of bearing 16 and 18. Force applied by the actuating means 36 is transmitted through outer race 30 to the preload device 32, then through an annular channel pilot ring 37 to the housing 14. In this way, a preload force exerted by preload device 32 is varied and is inversely related to a actuating force exerted by the actuating means 36. This configuration avoids the possibility of overloading the rolling elements 31, 31'.

By design, preload device 32 has a stiffness much greater than that of bearings 16 and 18. As such, the forces necessary to deflect preload device 32 to its maximum position (resulting in the minimum preload on bearings) are much greater than the frictional forces between the bearing and housing interface. In this way, accurate variation of preload is effected.

The axial shaft spacer or load transmitting means 34 may be included to transfer the force from the preload device 32 to the housing.

The actuator means 36 may be a hydraulic piston, a pneumatic piston, an electro-mechanical device or any well known element in which the load or axial displacement can be varied in a controllable manner. In this instance, the actuator means 36 is controlled from variable pressure fluid supply 41 as illustrated in FIGS. 1–4.

The actuator means 36 is the device which varies the preload, it can only act to reduce the preload applied to the bearings. The actuator means 36 in FIG. 1 acts directly through the outer race 30 of the second angular contact bearing 18. By comparison, the force exerted by the prior art variable preload devices act through the rolling elements 31, 31' of the bearings 16, 18, possibly overloading the rolling elements.

Prior art devices which vary loads tend to be expensive, imprecise or bulky. The instant configuration permits variation of the preload by the actuation means 36, without the danger of overloading rolling elements 31, 31' of the bearings 16, 18, and, therefore, without extreme concern to the pressures exerted by the preload varying device.

Normal axial loads on rotary shaft 10 in direction 44 will normally be transmitted to the inner race 24, the roller element 31 and the outer race 26 of the first bearing 16 and the annular channel pilot ring 37 and thence to the housing 14.

Normal axis loads on rotary shaft 10 in direction 46 will be transmitted through the inner race 28, rolling element 31', and the outer race 30 of the second bearing 18 to preload device 32. From there, the load is transmitted via spacer 34 to the annular channel pilot ring 37 and then to the housing 14.

FIG. 1 illustrates one system for preventing relative axial displacement between the outer race 26 of the first bearing 16 and the housing 14. The annular channel pilot ring 37 and ring member 37', which are fixed relative to the housing 14, form an annular channel 39 which conforms to outer race 26 of first bearing 16.

Figure 2:
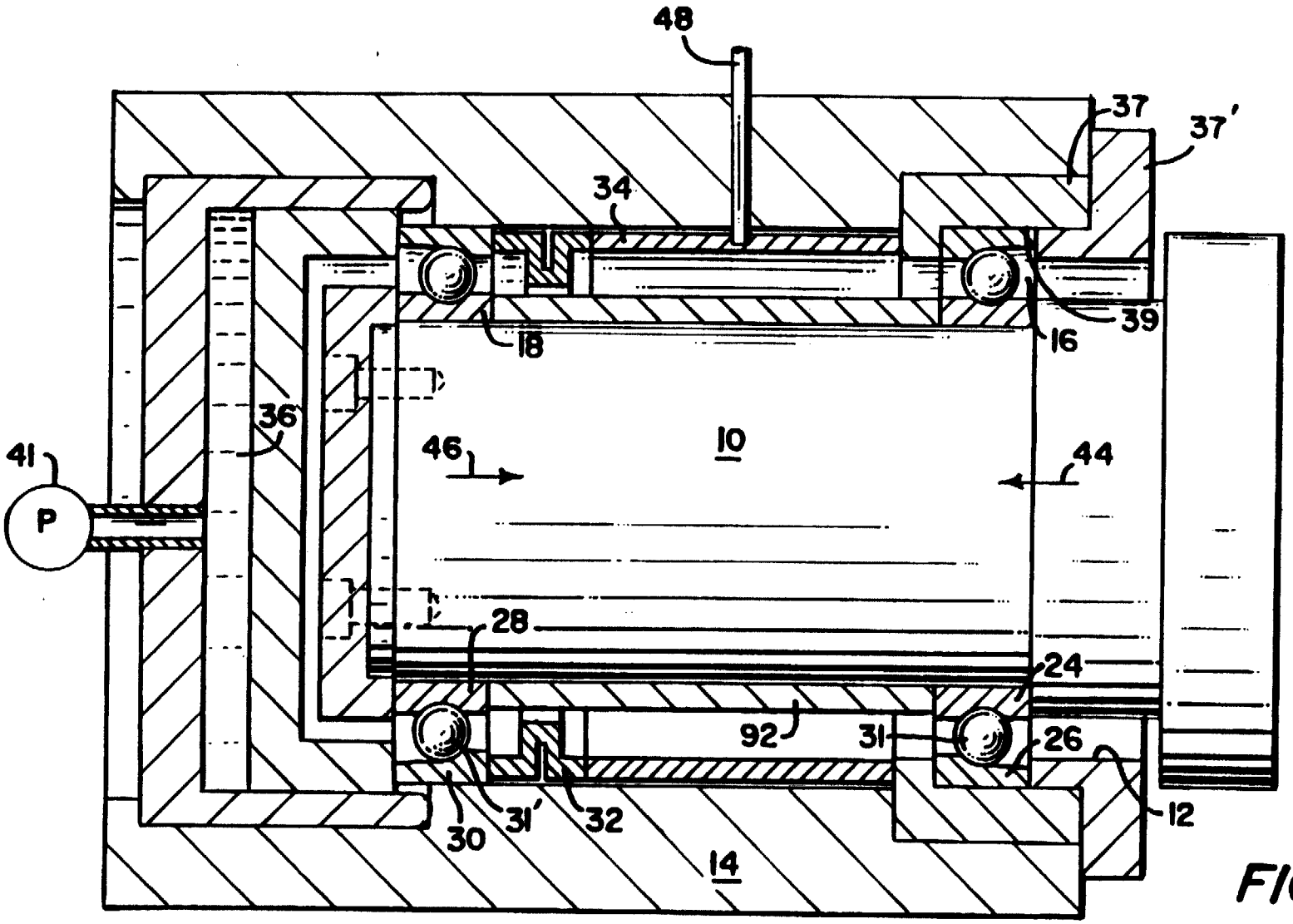
FIG. 2 is a side cross-sectional elevational view similar to FIG. 1, of an alternate embodiment of rotary shaft utilizing a pin member.

Another device which prevents relative axial motion between the outer race 26 of the fist bearing 16 and the first housing 14 is illustrated in FIG. 2, in which a pin 48 is inserted through the housing 14 into any intermediate element described in the preceding paragraphs, such as spacer 34. Loads will be transmitted directly from the intermediate member to the housing.

The spring rates of any elements located on the opposite side of the pinned element from the load will thereby not contribute to the spring rate which will oppose the load. In this manner, the total deflection rate of the system can be controlled by the insertion or removal of one or more pin members depending upon which element is pinned. The pin 48 also restricts excessive axial movement of the shaft 10 relative to the housing 14.

Figure 3:
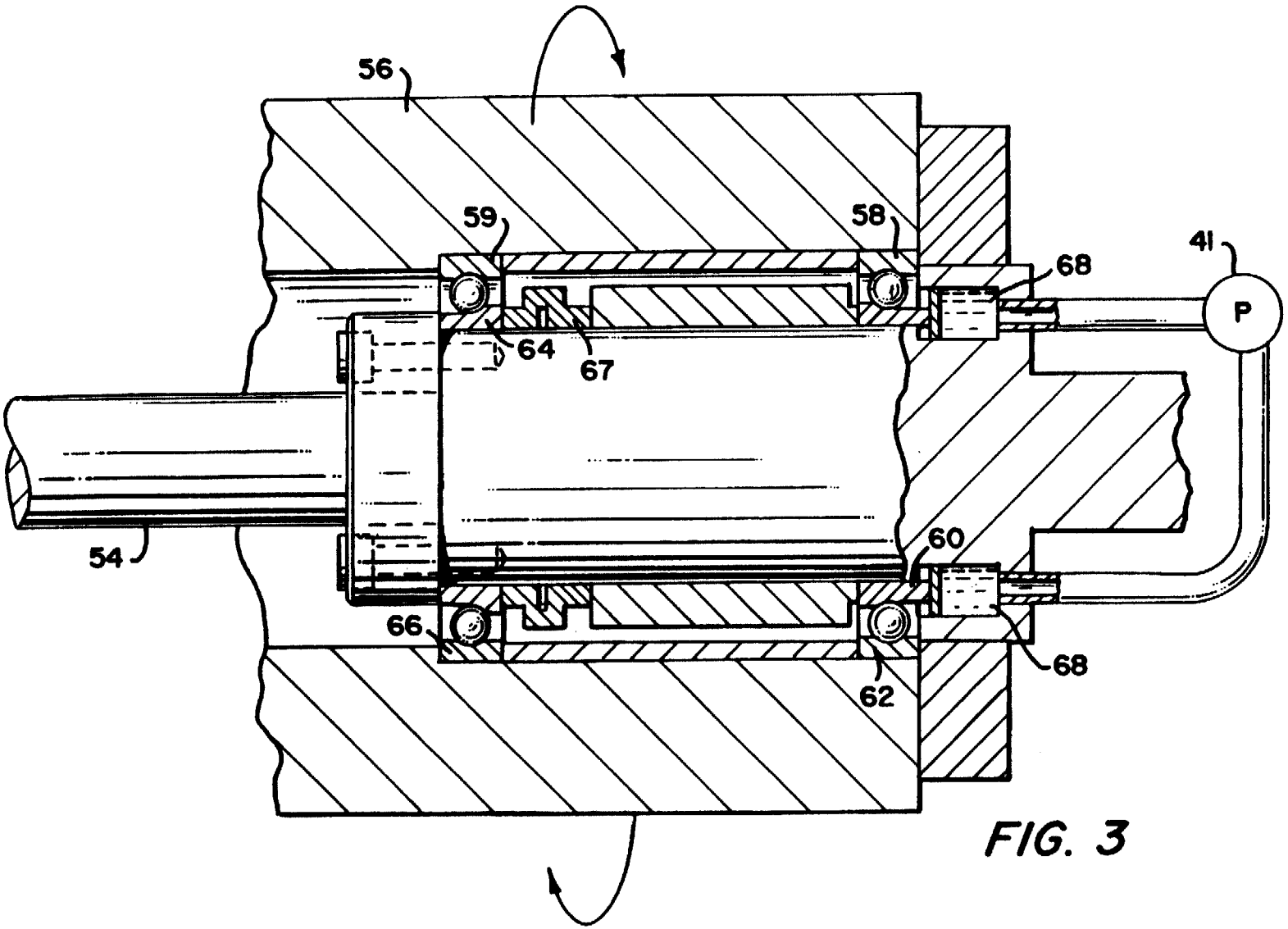
FIG. 3 is a similar view to FIG. 1 illustrating another alternate embodiment of a stationary shaft supported within a rotary housing by a plurality of preloaded bearings.

FIG. 3 illustrates a stationary shaft 54 inserted in a rotary housing 56, the rotary housing being supported by a first and a second angular contact bearings 58, 59. This configuration functions identically to that of the FIG. 1 configuration, except that an inner race 60 of the first angular contact bearing 58 is the only race of four races 60, 62, 64, 66 which can be axially displaced to place the two bearings 58, 60 into a preloaded state. Therefore, a preload device 67 and actuator means 68 act on opposing sides of the inner race 60 of the first angular contact bearing 58.

Figure 4:
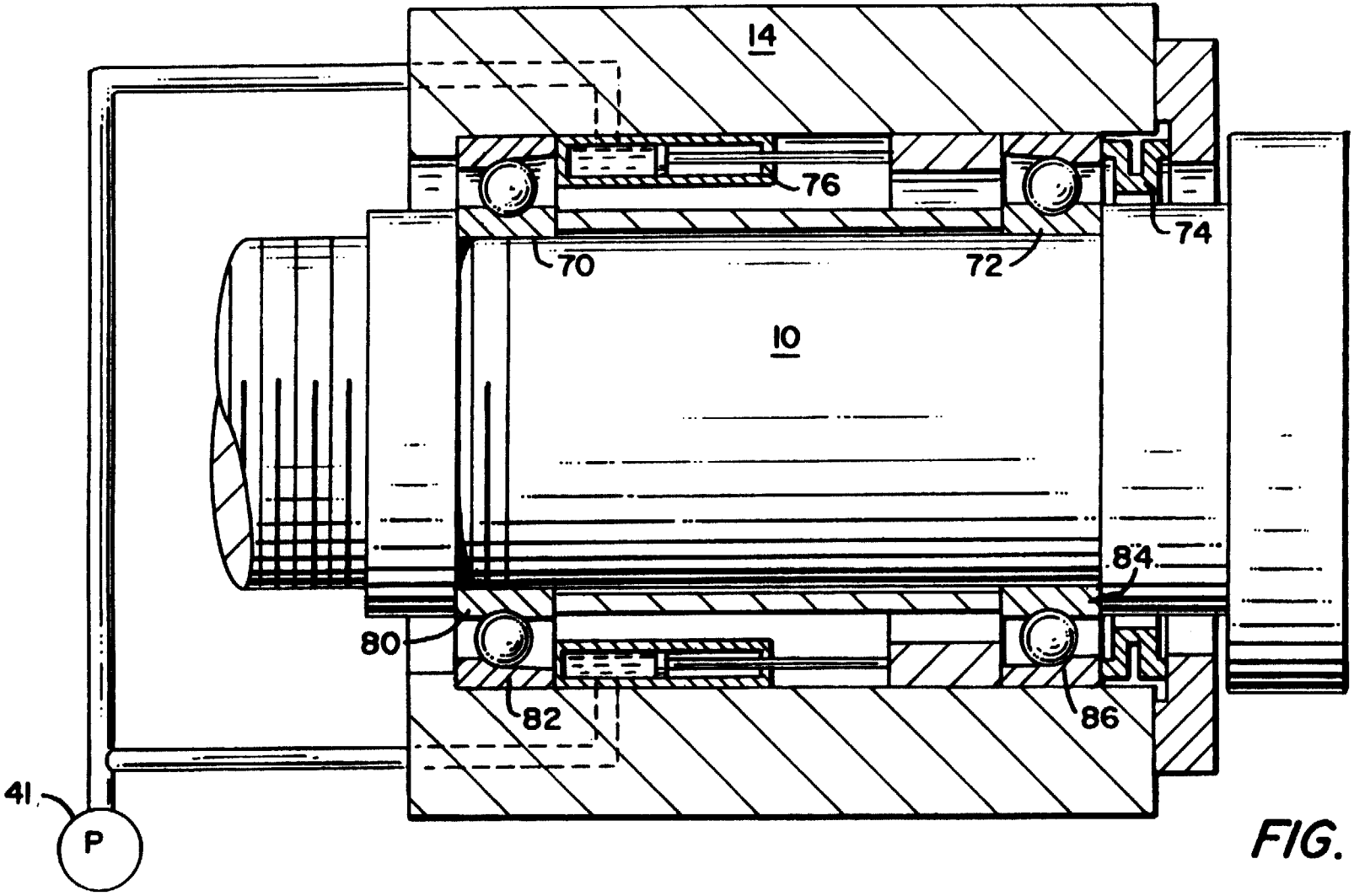
FIG. 4 is a similar view to FIG. 1 illustrating yet another embodiment of a rotary shaft supported by a plurality of preloaded bearings.

FIG. 4 illustrates a configuration to preload a plurality of angular contact bearings 70, 72 which is similar to the FIG. 1 configuration, except that a preload device 74 is disposed on the opposite side of the second angular contact bearing 72 from the first angular contact bearing 70, while an actuator means 76 is disposed between the first and the second angular contact bearing 70, 72.

The first angular contact bearing 70 has inner race 80 and outer race 82. The second angular contact bearing 72 has an inner race 84 and on outer race 86. The inner races 80 and 84 of the first and second angular contact bearings 70 and 72, respectively, are each fixed axially relative to the shaft 10. The outer race 82 of the first angular contact bearing 70 is restricted from axial motion relative to the housing.

The preload means 74 and the actuation means 76 interact to vary the force applied to, and the position of, the outer race 86 of the second angular contact bearing 72 relative to the housing. The outer race 86 of the second angular contact bearing is (in this configuration) the only race which can move to effect preload between the two bearings 70, 72.

These configurations illustrate the benefits of placing an actuator means and a preload means disposed on opposite sides of an axially displaceable race, in order to place a pair or multiple set of angular contact bearings in a variable preloaded condition.

Having described the invention, what is claimed is:

1. An apparatus comprising:

a shaft;

first and second angular contact bearing means, axially disposed along the shaft, for supporting the shaft in a first and a second axial direction, respectively, the second axial direction being substantially opposite said first direction;

preload means, for exerting a preload force onto the angular contact bearing means, for placing the angular contact bearing means into a maximum preload condition, *said preload means having a stiffness such that the deflection of said preload means is insignificant compared to the deflection of the bearing means at the maximum preload condition*; and actuator means, acting in opposition to the preload means, for reducing preload from the maximum preload condition to a desired preload condition.

2. The apparatus as described in claim 1, wherein the shaft is a rotary shaft and the first and second angular contact bearing means each further comprise:

an inner race and an outer race, with rolling elements spaced therebetween.

3. The apparatus as described in claim 2, wherein the preload means and the actuator means both exert force on the outer race of one of the angular contact bearing means.

4. The apparatus as described in claim 2, further comprising:

a housing with an aperture formed therein, the shaft is mounted within the aperture, wherein the inner race of the first angular contact bearing means is affixed to the shaft while the outer race of the first angular contact bearing means is affixed to the housing.

5. The apparatus as described in claim 1, wherein the actuator means forces the second angular contact bearing means in a direction toward the first angular contact bearing means.

6. An apparatus comprising:

a rotary shaft;

a first and a second angular contact bearing means, axially disposed along the rotary shaft, for supporting the rotary shaft in a first and a second axial direction, respectively, the second axial direction being substantially opposite said first direction, said first and second angular contact bearing means each including an inner and an outer race, and rolling elements spaced therebetween;

preload means, for exerting a first force on the outer race of the second angular contact bearing means, for placing the first and the second angular contact bearing means into a maximum preload condition, *said preload means having a stiffness such that the deflection of said preload means is insignificant compared to the deflection of the bearing means at the maximum preload condition*;

actuator means, exerting a second force on the outer race of the second angular contact bearing means, for reducing the preload from the maximum preload condition; and load transmitting means, connecting the inner races of the first and the second angular contact bearing means, for transmitting the force between the first and the second angular contact bearing means.

7. The apparatus as described in claim 6, wherein the first force is applied to the second angular contact bearing means in a direction opposite the first angular contact bearing means.

8. The apparatus as described in claim 1, wherein the actuator means forces the second angular contact bearing means in a direction away from the first angular contact bearing means.

9. The apparatus as described in claim 1, further comprising:

a rotary housing, the first and second angular contact means supporting the shaft relative to said rotary housing.

10. The apparatus as described in claim 9, further comprising an aperture formed in the rotary housing, the shaft being stationary and mounted within the aperture, wherein the first and second angular contact bearing means each having an inner race and an outer race, with rolling elements spaced therebetween, the inner race of the first angular contact bearing means being affixed to the stationary shaft and the outer race of the first angular contact bearing means being affixed to the rotary housing.

11. The apparatus as described in claim 2, wherein the preload means and the actuator means both act on the inner race of one of the angular contact bearing means.

12. The apparatus as described in claim 2, further comprising:

a load transmitting means, connecting the outer races of the first and the second angular contact bearing means, for transmitting force between the first and the second angular contact bearing means, the preload means exerting a first force on the inner race of the second angular contact bearing means and the actuator means exerting a second force on the inner race of the second angular contact bearing means.

13. The apparatus as described in claim 6, wherein the first force is applied to the second angular contact bearing means in a direction towards the first angular contact bearing means.

14. An apparatus comprising:

a shaft, the shaft being rotary;

first and second angular contact bearing means, axially disposed along the rotary shaft, for supporting the shaft in a first and a second axial direction, respectively, the second axial direction being substantially opposite said first direction, said first and second angular contact bearing means each including an inner and an outer race, and rolling elements spaced therebetween;

preload means, for exerting a first force onto the angular contact bearing means, for placing the angular contact bearing means into a maximum preload condition;

actuator means, acting in opposition to the preload means, for reducing the preload from the maximum preload condition to a desired preload condition, *said preload means having a stiffness such that the deflection of said preload means is insignificant compared to the deflection of the bearing means at the maximum preload condition*; and load transmitting means, connecting the outer races of the first and the second angular contact bearing means, for transmitting the force between the first and the second angular contact bearing means, the preload means exerting a first force on the inner race of the second angular contact bearing means and the actuator means exerting a second force on the inner race of the second angular contact bearing means.

15. An apparatus comprising:

a shaft;

a rotary housing, first and second angular contact bearing means, axially disposed along the shaft, for supporting the shaft in a first and second axial direction, respectively, the second axial direction being substantially opposite said first direction, said first and second angular contact bearing means each including an inner and an outer race, and rolling elements spaced therebetween;

preload means, for exerting a preload force onto the angular contact bearing means, for placing the angular contact bearing means into a maximum preload condition, *said preload means having a stiffness such that the deflection of said preload means is insignificant compared to the deflection of the bearing means at the maximum preload condition*; and actuator means, acting in opposition to the preload means, for reducing the preload from the maximum preload condition to a desired preload condition.

16. The apparatus as described in claim 15, wherein the first and second angular contact bearing means each further comprise:

an inner race and an outer race, with rolling elements spaced therebetween.

17. The apparatus as described in claim 16, wherein the preload means and the actuator means both exert force on the inner race of one of the angular contact bearing means.

18. The apparatus as described in claim 16, further comprising:

an aperture formed in the rotary housing, the shaft being stationary and mounted within the aperture, wherein the inner race of the first angular contact bearing means is affixed to the stationary shaft while the outer race of the first angular contact bearing means is affixed to the rotary housing.

*19. An apparatus comprising:*

*a shaft;*

*first and second angular contact bearing means, axially disposed along the shaft, for supporting the shaft in a first and a second axial direction, respectively, the second axial direction being substantially opposite said first direction, said contact bearing means having a spring rate corresponding to deflection in response to axial load;*

*preload means, for exerting a preload force onto the angular contact bearing means, for placing the angular contact bearing means into a maximum preload condition, said preload means having a spring rate greater than the spring rate of the angular contact bearing means; and*

*actuator means, acting in opposition to the preload means, for reducing preload from the maximum preload condition to a desired preload condition.*

* * * * *